(12) United States Patent
Yoshitani et al.

(10) Patent No.: US 10,479,039 B2
(45) Date of Patent: Nov. 19, 2019

(54) BRIQUETTING ROLL AND METHOD FOR MANUFACTURING THE SAME

(71) Applicant: FUJICO CO., LTD., Fukuoka (JP)

(72) Inventors: Kazumasa Yoshitani, Okayama (JP); Takashi Kikuchi, Okayama (JP); Hyo-Gyoung Kang, Okayama (JP); Hiroaki Furuta, Okayama (JP)

(73) Assignee: FUJICO CO., LTD., Kitakyushu-Shi, Fukuoka (JP)

( * ) Notice: Subject to any disclaimer, the term of this patent is extended or adjusted under 35 U.S.C. 154(b) by 163 days.

(21) Appl. No.: 15/555,589

(22) PCT Filed: Mar. 3, 2016

(86) PCT No.: PCT/JP2016/056545
§ 371 (c)(1),
(2) Date: Sep. 5, 2017

(87) PCT Pub. No.: WO2016/140296
PCT Pub. Date: Sep. 9, 2016

(65) Prior Publication Data
US 2018/0036983 A1    Feb. 8, 2018

(30) Foreign Application Priority Data

Mar. 4, 2015  (JP) ................................ 2015-042991

(51) Int. Cl.
*B30B 11/16*    (2006.01)
*B22D 11/00*    (2006.01)
(Continued)

(52) U.S. Cl.
CPC .......... *B30B 11/165* (2013.01); *B22D 11/001* (2013.01); *B22D 19/16* (2013.01); *C21D 1/18* (2013.01); *C21D 1/613* (2013.01); *C21D 6/002* (2013.01); *C21D 6/005* (2013.01); *C21D 6/008* (2013.01); *C21D 9/38* (2013.01); *C22C 38/02* (2013.01); *C22C 38/04* (2013.01); *C22C 38/22* (2013.01); *C22C 38/24* (2013.01)

(58) Field of Classification Search
CPC ................................. B01J 2/22; B22D 19/16
See application file for complete search history.

(56) References Cited

U.S. PATENT DOCUMENTS 5,215,765 A * 6/1993 Bergendahl ........... B30B 11/165
                                                             100/176
6,283,198 B1 * 9/2001 Medovar ................ B22D 19/08
                                                             164/496
(Continued)

FOREIGN PATENT DOCUMENTS

AU    2011361271 A    5/2013
CN    102430582 B    9/2013
(Continued)

OTHER PUBLICATIONS

EP-0025394-A1 Machine Translation (Year: 1980).*
Extended European Search Report in corresponding European Patent Appln. No. 16758988.6 dated Jul. 12, 2018.

*Primary Examiner* — Jacob J Cigna
(74) *Attorney, Agent, or Firm* — Bacon & Thomas, PLLC

(57) ABSTRACT

A novel briquetting roll having excellent performance such as providing both abrasion resistance and spalling resistance, which can also be manufactured at low cost and in a short period of time, and a method for manufacturing the same, are provided wherein the briquetting roll 1 integrally has an inner layer material 4 and an outer layer material 5, which comprise mutually different materials and are in contact with each other at the respective exterior and interior thereof, and has pockets 6 formed at the outer circumference of the outer layer material 5. A chromium-molybdenum forged steel material is used for the inner layer material 4 and a high-carbon high-speed steel material is used for the outer layer material 5. The outer layer material 5 may be formed on the outside of the inner layer material 4 by a continuous pouring process.

11 Claims, 4 Drawing Sheets

(51) Int. Cl.
*C21D 1/18* (2006.01)
*C22C 38/02* (2006.01)
*B22D 19/16* (2006.01)
*C21D 1/613* (2006.01)
*C21D 6/00* (2006.01)
*C21D 9/38* (2006.01)
*C22C 38/04* (2006.01)
*C22C 38/22* (2006.01)
*C22C 38/24* (2006.01)

(56) References Cited

U.S. PATENT DOCUMENTS

| | | | |
|---|---|---|---|
| 9,180,516 B2 * | 11/2015 | Frangenberg | B22D 13/00 |
| 2001/0001670 A1 * | 5/2001 | Krismanth | B30B 11/16 |
| | | | 425/237 |

FOREIGN PATENT DOCUMENTS

| | | | | |
|---|---|---|---|---|
| DE | 102013103884 B3 | | 8/2014 | |
| EP | 0025394 | | 3/1981 | |
| EP | 0025394 A1 | * | 3/1981 | ............ B21B 27/00 |
| EP | 0309587 A1 | | 4/1989 | |
| JP | S5242474 A | | 4/1977 | |
| JP | S592425 U | | 1/1981 | |
| JP | H079198 A | | 1/1995 | |
| JP | 08120418 A | * | 5/1996 | |
| JP | 2005169460 A | * | 6/2005 | |
| JP | 2005169460 A | | 6/2005 | |
| JP | 2007050359 A | | 3/2007 | |
| JP | 2009214122 A | | 9/2009 | |
| JP | 2011194421 A | * | 10/2011 | |
| JP | 2014050845 A | | 3/2014 | |
| WO | WO_2012117459 A1 | | 9/2012 | |

* cited by examiner outer diameter machining

3(4,5)

machining prior to heat treatment 4  
5 } 3 cup machining 3    6 vacuum heat treatment

3 inner diameter machining with vertical lathe

3 shrink fitting 3    2 outer diameter machining machining prior to heat treatment cup machining vacuum heat treatment mounting surface machining assembly

BRIQUETTING ROLL AND METHOD FOR MANUFACTURING THE SAME

TECHNICAL FIELD

The present invention relates to a briquetting roll for briquetting ironmaking dust and the like, and to a method for manufacturing the same.

BACKGROUND ART

Briquetting rolls are used to briquette powders and granules such as ironmaking dust or product scraps, so as to produce a briquette shape with a view to facilitating reuse. That is to say, briquetting rolls are rolls having multiplicity of pockets (indentations) formed in the outer circumferential surface, and two rolls are arranged in parallel at positions vertically or horizontally close to each other, and driven in rotation in opposite directions to each other (see FIGS. 1A and 1B). The powders and granules are supplied as raw materials between the two briquetting rolls, so as to produce a briquette having a shape corresponding to the shape of the pockets.

Patent Literatures relating to briquetting rolls include, for example, the following PTL 1.

In general, briquetting rolls are made by shrink fitting an annular sleeve on the outer circumference of a drum (large diameter part) in the middle of a shaft made of steel. For briquetting rolls that handle ironmaking dust and the like, conventionally, the sleeve is generally formed from a single material (single layer structure) which is high-speed tool steel (SKD 61) or high-chromium cast iron. Sleeves made of these materials are cast by centrifugal casting or ordinary static casting, then heat treatment is carried out to maximize the hardness, whereafter the pockets are machined by electric discharge machining. Such a sleeve is integrated with the shaft by shrink fitting, to be used as a briquetting roll.

In cases such as when handling hard powders and granules or when hard foreign matter is included or the like, spalling (breaking) may occur in the vicinity of the surface of the roll, and the pockets often become shallow due to early wear. Briquetting rolls must, therefore, have sufficient mechanical strength. In particular, it is desirable to increase the fracture toughness value, so as to impart spalling resistance, and to increase hardness, so as to increase abrasion resistance.

With an integral type sleeve, the entire unit becomes unusable if spalling occurs locally. To avoid this, the sleeve is sometimes configured in a divided type (a sleeve resulting from combining a plurality of segments is used in place of an integral sleeve).

CITATION LIST

Patent Literature

[PTL 1] Japanese Unexamined Patent Application Publication No. 2007-50359

SUMMARY OF INVENTION

Technical Problem

Conventional briquetting rolls, in which the sleeve portion is formed with a single layer structure of high-speed tool steel or high-chromium cast iron, are not sufficient in terms of providing both abrasion resistance and spalling resistance. This is because it is difficult to both increase abrasion resistance by producing high hardness, and increase spalling resistance by producing high toughness. Accordingly, during use, spalling resulted in breaking, and abrasion advanced such that the pocket shapes tended to be degraded, and it can not be said that the service life is sufficient.

Conventional briquetting rolls formed with the aforementioned materials also have the disadvantage caused by being manufactured by centrifugal casting or ordinary static casting. In centrifugal casting and ordinary static casting, there is a limitation on the cooling rate during casting, in addition to which, because segregation and formation of abnormal carbides tend to occur, V, Mo and W, which are hard carbide forming elements, cannot be added in large amounts, this makes it difficult to improve abrasion resistance.

Furthermore, the manufacturing methods also present problems in terms of the difficulty of cutting after heat treatment. Machining of the pockets is performed after the heat treatment that serves to increase the hardness, as described above, and because this makes ordinary cutting work difficult, this is performed by electric discharge machining. Forming the pockets by electric discharge machining requires a great deal of time and expense, resulting in increased roll costs and a prolonged manufacturing times.

Even when the sleeve is configured with a divided type as described above, there is a problem in that the manufacturing process is complicated and the manufacturing costs increase.

Briquetting rolls having a two-layer structure, in which an inner layer material and an outer layer material, comprising different materials, are made into an integral sleeve, are also sometimes manufactured by centrifugal casting. Ductile cast iron is used as the inner layer material (base material), and high-speed tool steel or high-chromium cast iron is used for the outer layer material.

However, when materials resulting from refining high-speed tool steel are used for the outer layer material of an integral type sleeve, while the hardness is high, the fracture toughness is low, and therefore spalling and breakage occur during use, such that the frequency with which the entire roll is replaced tends to be high, in addition to which, abrasion resistance cannot be said to be sufficient. Meanwhile, high-chromium cast iron, with which the outer layer is formed by centrifugal casting or ordinary static casting, presents limitations on adding large amounts of carbide forming elements in order to increase abrasion resistance, in addition to which, because the base material is ductile cast iron, chilling and graphite deformation at the boundary layer are accompanied by destabilization of the material properties at the boundary, which is associated with problems in terms of abrasion resistance and breaking at the boundary layers.

In consideration of the foregoing matters, the claimed invention provides a novel briquetting roll having excellent performance, such as providing both abrasion resistance and spalling resistance, and which can be manufactured at low cost in a short period of time, and a method for manufacturing the same.

Solution to Problem

A briquetting roll of the present invention integrally has an inner layer material and an outer layer material, which comprise mutually different materials and are in contact with each other at the respective exterior and interior thereof, and has pockets formed at the outer circumference of the outer layer material, wherein the inner layer material is a chromium-molybdenum forged steel material, and the outer layer material is a high-carbon high-speed steel material.

A chromium-molybdenum forged steel material refers to an alloy steel material for machine structural use, stipulated in JIS-G4053, including SCM 440 and the like. A high-carbon high-speed steel material refers to a high-speed steel containing carbon at a mass ratio of 1% or more and containing Cr, Mo, V and W at approximately several percent each.

In the briquetting roll of the invention, the chromium-molybdenum forged steel material serving as the inner layer material can be given high toughness characteristics, and the high-carbon high-speed steel material serving as the outer layer material can be made extremely hard. Because these two layers are integrally formed so as to be in contact with each other at the respective exterior and interior thereof, the briquetting roll of the invention can be endowed with both abrasion resistance and spalling resistance.

Preferably, in the briquetting roll, the inner layer material is SCM 440, and the high-carbon high-speed steel material, which is the outer layer material, comprises, as mass ratios, C: 1.5 to 2.5%, Si: 0.2 to 1.0%, Mn: 0.2 to 1.2%, Ni: 0 to 1.6%, Cr: 2.5 to 11%, Mo: 0.2 to 8.0%, V: 0.2 to 8.5%, W: 0 to 5.0%, Co: 0 to 5.0%, and the balance of Fe and inevitable impurities, having a secondary dendrite size of 20 to 150 μm, a total carbide area ratio of 15 to 30%, and a surface hardness of HS 87 to 93.

Such a briquetting roll has an optimal combination of the inner layer material and the outer layer material. That is to say, the mechanical properties (high toughness and the like) of the SCM 440, which is the inner layer material, and the mechanical properties (high hardness and the like) of the high-carbon high-speed steel material, which is the outer layer material, are matched such that in the briquetting roll both the abrasion resistance and the spalling resistance are excellent.

The briquetting roll, in which the outer layer material is formed on the outside of the inner layer material by way of a continuous pouring process, is particularly advantageous.

The continuous pouring process (CPC: Continuous Pouring process for Cladding) is a method in which a solid or hollow core material made of steel is inserted concentrically and perpendicularly into a hollow combination mold and molten metal is injected into the annular gap on the outside of the core material, while the core material is continuously lowered, and the molten metal is welded to the outer circumference of the core material and solidified to form a cladding layer (see FIG. 2). The core material serves as the inner layer material, and the cladding layer formed on the outside serves as the outer layer material. This method is also adopted for the production of rolls for rolling, such as for steel bars, shaped steel, wires, steel plates and the like.

With the continuous pouring process, the chemical composition and structure of both the inner layer material and the outer layer material can be made uniform, and at the boundary therebetween a metallurgical bond is formed that does not separate. Furthermore, as differs from the case in which either of the layers is formed by centrifugal casting or ordinary static casting, it is possible to increase the cooling rate during casting, in addition to which, because segregation and formation of abnormal carbides do not readily occur, Cr, V, Mo, W and the like can be added in large amounts, such that it is not difficult to increase the mechanical strength and hardness of the casting layer. The briquetting roll manufactured by the continuous pouring process can therefore be said to be extremely advantageous in terms of mechanical properties such as abrasion resistance and spalling resistance.

It is particularly preferable that the briquetting roll is one in which, after the outer layer material has been formed on the outside of the inner layer material, homogenization heat treatment and quenching by nitrogen cooling are carried out in a vacuum furnace.

If quenching is performed by forced air cooling after homogenization treatment in atmospheric air, the cooling rate in the y austenite region will be slow, and therefore micro component segregation will occur between the matrix and the carbides, which tends to result in inferior toughness, with this becoming a starting point for crack propagation during use, and tending to lead to non-uniform abrasion. In this regard, if homogenization heat treatment and quenching by nitrogen cooling (pressurized cooling) are performed using a vacuum furnace, the cooling rate can be increased also in the y austenite region, and thus the structures of the inner layer material and the outer layer material can be made finer and more homogeneous, allowing for increased toughness. Furthermore, because no oxidized layer or decarbonized layer forms on the surface of materials that have been heat-treated in a vacuum furnace as described above, there is little deformation and no discoloration.

The briquetting roll may also notably be one in which a sleeve integrally having the inner layer material and the outer layer material, and having pockets formed at the outer circumference of the outer layer material, is shrink-fitted on the outer circumference of a drum on a shaft.

The briquetting roll described above may also be one in which the inner layer material is first united with the outer circumference of the drum on the steel shaft (first by a method such as casting rather than by shrink-fitting), whereafter the outer layer material is integrally formed on the outside of the inner layer material. However, this briquetting roll is one in which a sleeve with a united inner layer material and outer layer material is shrink-fitted on the drum.

Using an inner layer material and an outer layer material as an integral sleeve that is shrink-fitted on a drum on a shaft has heretofore been adopted as a method for manufacturing briquetting rolls. Such a manufacturing method is extremely convenient in terms of performing the heat treatment using a vacuum furnace as described above. This is because, it is difficult to increase the size of a vacuum furnace, due to performance matters, and thus heat-treating objects with large dimensions results in difficulties or expenses in terms of the facilities, however, the sleeve comprising the inner layer material and the outer layer material prior to being shrink-fitted on the drum does not include the shaft such that the dimensions thereof are small, and thus heat treatment can be performed with a relatively small vacuum furnace. Also, not including the shaft, the sleeve is lightweight, this is also advantageous in terms of machining the pockets.

The briquetting roll of the invention may also be one in which the sleeve is a divided type, which is to say that a plurality of arcuate segments integrally having the inner layer material and the outer layer material, and having pockets formed at the outer circumference of the outer layer material, are attached to the drum on the shaft, so as to cover the outer circumference of the drum. FIG. 5F illustrates one example of such a briquetting roll.

With a briquetting roll of this sort as well, two layers, comprising an inner layer material made of a chromium-molybdenum forged steel material and an outer layer material made of a high-carbon high-speed steel material, are integrally formed so as to be in contact with each other at the respective exterior and interior thereof, and therefore abrasion resistance and spalling resistance are both provided. Because the portion corresponding to the sleeve described above is divided into a plurality of segments, even if spalling occurs locally, it will not be necessary to replace the entire sleeve, but rather it suffices to replace only the segment for the corresponding portion. If it suffices to replace some of the segments, repair is facilitated, and thus the amount of time for which operations are stopped during repairs will be short.

The manufacturing method according to the present invention is a method for manufacturing a briquetting roll, the roll integrally having an inner layer material and an outer layer material, which comprise mutually different materials and are in contact with each other at the respective exterior and interior thereof, and having pockets formed at the outer circumference of the outer layer material, wherein a chromium-molybdenum forged steel (for example, SCM 440) material is used as the inner layer material, and the outer layer material is formed on the outside of the inner layer material by cladding with a high-carbon high-speed steel material by way of a continuous pouring process. The pockets are formed at the surface of the outer layer material thus formed.

With a manufacturing method of this sort, as described above, a briquetting roll can be manufactured in which both the abrasion resistance and the spalling resistance are high, the chemical composition and structure of the inner layer material and the outer layer material are uniform, separation does not occur at the boundary therebetween, and the service life is long.

In the manufacturing method described above, it is particularly preferable that, after the outer layer material has been formed on the outside of the inner layer material as described above, homogenization heat treatment and quenching by nitrogen cooling are carried out in a vacuum furnace.

In this manner, the structure of the inner layer material and the outer layer material can be made finer and the toughness can be increased, in addition to which, the formation of oxidized layers and decarbonized layers on the surface can be prevented, allowing deformation to be limited to approximately 1 mm in terms of diameter (which facilitates finishing work).

It is advantageous that, after the outer layer material has been formed on the outside of the inner layer material as described above, annealing is performed, and then the pockets are mechanically machined into the surface of the outer layer material, whereafter homogenization heat treatment and quenching by nitrogen cooling are carried out in a vacuum furnace.

With such a procedure, the pocket machining can be performed at low cost in a short period of time. If the outer layer material is formed and then annealing is performed to have a surface hardness of HS 50 or less for example, and mechanical machining is performed before quenching is carried out as described above, the pockets can be efficiently machined using ordinary cutting machines (rather than electric discharge machining). If the homogenization heat treatment and quenching are performed in a vacuum furnace after completion of the machining, as described above, a preferred briquetting roll having a high hardness (HS of approximately 87 to 93) can be manufactured.

This may also be such that, the inner layer material is cylindrical, the outer layer material is formed on the outside of the inner layer material to produce an integral sleeve, the pockets are mechanically machined into the surface of the sleeve, and then quenching is carried out, and the sleeve is shrink-fitted on the outer circumference of the drum on the shaft.

The manufacturing method described above includes methods wherein the inner layer material is united on the outer circumference of the drum on the steel shaft in advance, and the outer layer material is integrally formed on the outside of the inner layer material, but the manufacturing method referred to here is one wherein the inner layer material and the outer layer material are first formed as a sleeve that is separate from the drum, and then shrink-fitted on the drum to produce a briquetting roll.

Because the sleeve before being shrink-fitted on the drum is small in size and lightweight, this method makes it easier to mechanically machine the pockets and to subsequently perform heat treatment, which allows for cost reductions and shorter manufacturing times for the briquetting roll.

Also preferable, as the manufacturing method of the invention, is a method wherein:

after the outer layer material has been formed on the entire outer circumference of the cylindrical inner layer material by a continuous pouring process, the inner layer material and the outer layer material are divided into a plurality of arcuate segments; and for each segment, annealing is performed, and then pockets are mechanically machined into the surface of the outer layer material, whereafter homogenization heat treatment and quenching by nitrogen cooling are carried out in a vacuum furnace, and after machining the mounting surfaces (joining surfaces with adjacent segments, joining surfaces with the drum on the shaft and the like), all of the segments are attached to the drum on the shaft so as to cover the entire outer circumference of the drum.

FIGS. 5A to 5F illustrates one example of a manufacturing method of this sort.

With this manufacturing method, it is possible to smoothly manufacture the divided type briquetting roll described above. That is to say, firstly, because the outer layer material (high-carbon high-speed steel material) is clad by the continuous pouring process on the outside of the inner layer material (chromium-molybdenum forged steel material), a preferred briquetting roll can be produced, with which both abrasion resistance and spalling resistance are high, and the chemical composition and structure of the inner layer material and the outer layer material are uniform, such that these do not separate at the boundary. Because mechanical machining is performed after annealing and before quenching for each divided segment, the pockets can be efficiently machined using ordinary cutting machines. Furthermore, because the homogenization heat treatment and the quenching are performed in a vacuum furnace after completion of that machining, the structures of the inner layer material and the outer layer material can be made finer and thus toughness can be increased, in addition to which, an effect is also provided in which the formation of an oxidized layer or decarbonized layer on the surface is prevented, and thus deformation can be limited. Because each divided segment is dimensionally small and lightweight, each of the steps of mechanically machining the pockets and heat treating as described above can easily be performed.

Advantageous Effects of the Invention

The briquetting roll of the invention is configured for long-term service life, providing high levels of both abrasion resistance and spalling resistance.

Furthermore, with the manufacturing method of the invention, a high-strength, long service-life briquetting roll can be manufactured, with which both abrasion resistance and spalling resistance are high, and the chemical composition and structure of both of the layers are uniform, such that these layers do not separate at the boundary.

In particular, if the outer layer material is formed on the outside of the inner layer material and then the pockets are mechanically machined into the surface of the outer layer material prior to quenching and the like, there will be no need to perform electric discharge machining, allowing the briquetting roll to be produced as a low-cost and short delivery-time product.

Furthermore, the divided type briquetting roll according to the invention has the effect of further facilitating maintenance, and the manufacturing method according to the invention has the advantage allowing each step to be performed easily.

BRIEF DESCRIPTION OF DRAWINGS

FIGS. 1A and 1B are schematic views illustrating a briquetting roll 1, in which FIG. 1A is a cross sectional view illustrating the situation during use, and FIG. 1B is a longitudinal sectional view. An enlarged view of a pocket 6 at the outer circumference is illustrated in the detail callout in FIG. 1B.

DESCRIPTION OF EMBODIMENTS

Figure 1A:
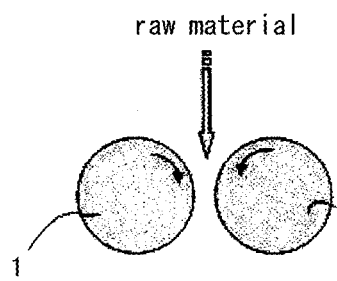
Figure 1B:
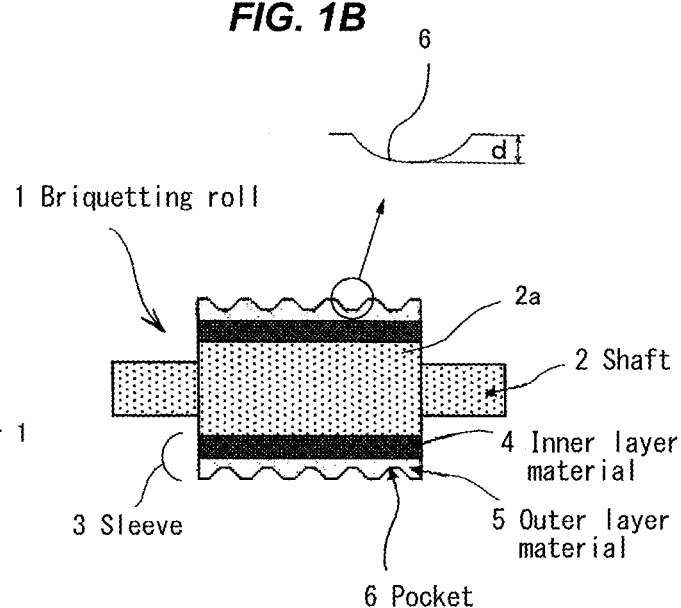

As described above, briquetting rolls are rolls for briquetting powders and granules raw materials, and this equipment is used in sets of two (see FIG. 1A. As illustrated in FIG. 1B, a sleeve 3 comprising a hard material is fitted to the outer circumference of a drum 2a on a carbon steel shaft 2, so as to constitute a briquetting roll 1, and a multiplicity of pockets 6 for briquetting are formed at the outer circumferential surface thereof.

The briquetting roll 1 that has now been developed has high strength and a long service life even when handling ironmaking dust, iron product scraps and the like. Hereafter, the briquetting roll 1 and a method of manufacturing the same will be described.

As illustrated in FIG. 1B, the briquetting roll 1 has a two-layer structure of the sleeve 3 fitted on the drum 2a on the shaft 2. In the two-layer structure, an inner layer material 4 is a JIS-SCM 440 forged steel material having high toughness, and an outer layer material 5 is a hard high-carbon high-speed steel material.

The high-carbon high-speed steel material, which is the outer layer material 5, comprises, as mass ratios, C: 1.5 to 2.5%, Si: 0.2 to 1.0%, Mn: 0.2 to 1.2%, Ni: 0 to 1.6%, Cr: 2.5 to 11%, Mo: 0.2 to 8.0%, V: 0.2 to 8.5%, W: 0 to 5.0%, Co: 0 to 5.0% and the balance of Fe and inevitable impurities.

The briquetting roll 1 is manufactured by manufacturing the two-layer structure sleeve 3, and then shrink-fitting this sleeve 3 on the drum 2a on the shaft 2. The details of the manufacturing method are as follows.

Figure 2:
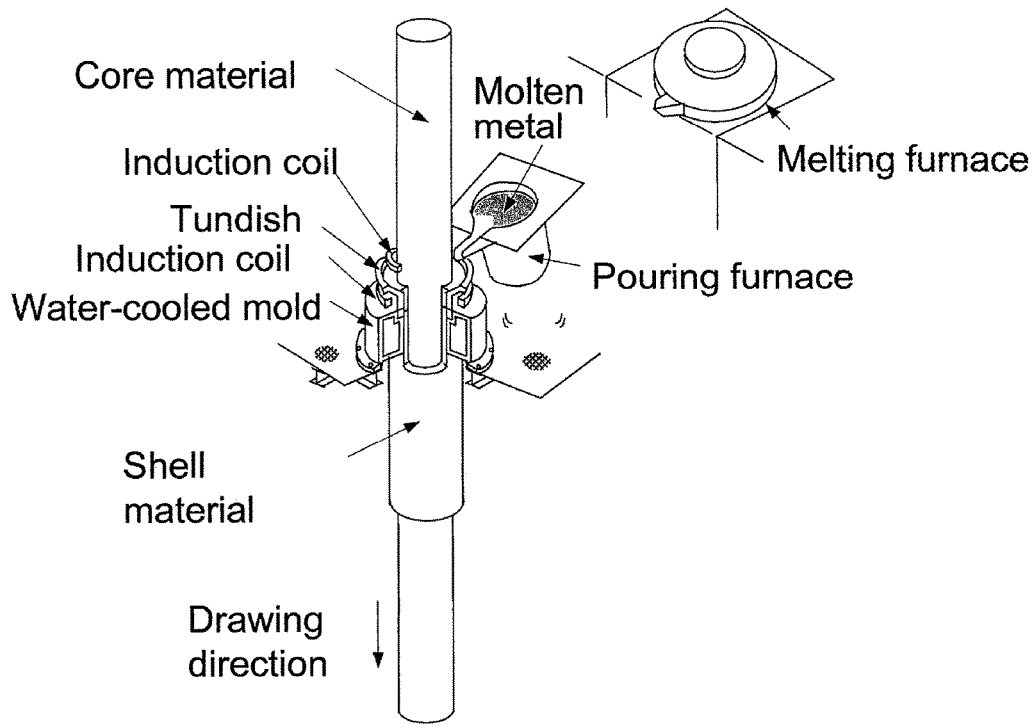
FIG. 2 is an explanatory diagram, seen as a perspective view, illustrating a continuous pouring process, which is included in the manufacturing process for the briquetting roll 1.

First, a solid or hollow core material, which serves as the inner layer material 4 of the sleeve 3 (see the reference numerals in FIG. 1B is prepared and the outer layer material 5 is clad on the outside of the core material by the continuous pouring process illustrated in FIG. 2. The SCM 440 forged steel material mentioned above is used as the core material, which is to say the inner layer material 4, and the outer layer material 5 is clad on the outside of the inner layer material 4 by pouring the high-carbon high-speed steel material mentioned above between the mold and the core material in the continuous pouring process.

Figure 3A:
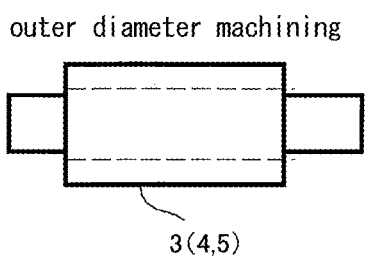
FIGS. 3A to 3F are explanatory diagram illustrating the process after the continuous pouring process is performed in the manufacture of the briquetting roll 1.
Figure 3B:
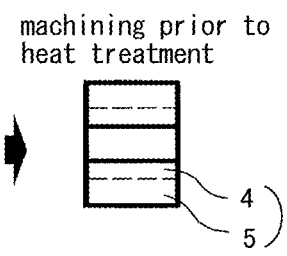
Figure 3C:
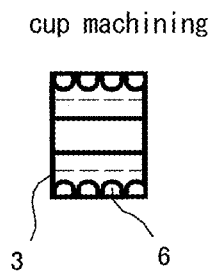

Once the material for the sleeve 3 is formed by uniting the outer layer material 5 on the outside of the inner layer material 4 as described above, mechanical machining or the like is carried out for the material, according to FIGS. 3A to 3C.

That is to say, the outer diameter of the elongate material for the sleeve 3 is first mechanically machined (roughly machined) (FIG. 3A).

Next, the inner diameter of the aforementioned material is mechanically machined (roughly machined), the material is cut to adjust the length of the sleeve 3, and then the outer diameter is mechanically machined (finishing prior to heat treatment) (FIG. 3B).

Subsequently, the sleeve 3 is annealed and then a multiplicity of pockets (cups) are formed by mechanical machining into the surface of the outer layer material 5 (FIG. 3C).

Figure 3D:
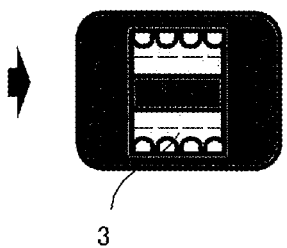

The sleeve 3 for which formation of the pockets 6 at the outer circumference has been completed is heat-treated in a vacuum furnace (FIG. 3D). The heat treatment includes performing homogenization heat treatment, then carrying out quenching by nitrogen cooling, and further performing secondary hardening heat treatment and final tempering. As a result, the outer layer material 5 is caused to contain fine carbides in a tough matrix structure having a secondary dendrite size of 20 to 150 μm and a total carbide area ratio of 15 to 30%. The surface hardness of the outer layer material 5 after the heat treatment is HS 87 to 93.

When quenching by nitrogen cooling, the cooling rate in the γ region (γ austenite region which, in the Working Example, is the temperature region from the quenching temperature to 750° C.) is caused to be 50° C./min or more. As a result, segregation at grain boundaries is reduced, and the bonding force between the carbide and the matrix is strengthened, and thereby both abrasion resistance and toughness are improved.

Figure 3E:
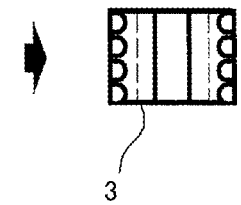
Figure 3F:
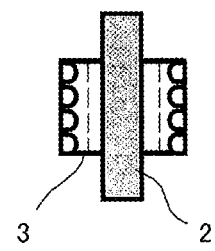

After heat treatment, the inner diameter of the sleeve 3 is finished with a vertical lathe or the like (FIG. 3E), and the sleeve 3 thus prepared is shrink-fitted on the outer circumference of (the drum 2a on) the shaft 2 (FIG. 3F).

Thereafter, the outer circumferential surface of the sleeve 3 is polished to complete the briquetting roll 1.

The depth d (see the detail callout in FIG. 1B) of the pockets 6 that are provided at the outer circumference of the briquetting roll 1 (the sleeve 3) is initially (when not yet used) 5 to 20 mm (for example, 8 mm). Since the outer circumferential surface of the briquetting roll 1 will be abraded with use, the depth d will gradually become shallower.

The inventors investigated the rate at which the depth d of the pockets 6 in the briquetting roll 1 shallowed with use, which is to say, the abrasion rate at the outer circumferential surface.

The investigation was performed by preparing the briquetting roll 1 of the Working Example, which was manufactured as described above, and briquetting rolls of Comparative Example 1 and Comparative Example 2, in which the manufacturing methods were different (an inner layer material and an outer layer material that were similar materials to that in the Working Example were made in a two-layer structure) and actually using these at an ironworks. The briquetting roll of Comparative Example 1 is one in which, after the outer layer material had been formed on the outside of the inner layer material by centrifugal casting, quenching and tempering were performed in an atmospheric furnace, rather than a vacuum furnace, and after heat treating these layers, pockets were formed by electric discharge machining. The briquetting roll of Comparative Example 2 is one in which, after the outer layer material had been formed on the outside of the inner layer material by the continuous pouring process, quenching and tempering were performed in an atmospheric furnace, and after heat treating these layers, pockets were formed by electric discharge machining. The hardness of the roll surface was HS 90 to 91 in the Working Example, in contrast with which, this was HS 80 to 85 in Comparative Example 1, and HS 83 to 86 in Comparative Example 2.

The depth (remaining cup depth) of the pockets 6 in the briquetting rolls when used for three months (3 M) or more was measured and the abrasion rates per month (mm/M) were calculated from the result and are shown in Table 1. It is estimated that the abrasion rate in the briquetting roll 1 of the Working Example is the slowest, and thus this roll 1 has the longest service life. Note that spalling did not occur in any of the briquetting rolls of the Working Example or of Comparative Examples 1 and 2.

TABLE 1

Cup Abrasion Rate

|  | abrasion rate |
| --- | --- |
| Comparative Example 1 | 0.29 to 0.32 mm/M |
| Comparative Example 2 | 0.08 to 0.17 mm/M |
| Working Example | 0.05 to 0.10 mm/M |

Figure 4:
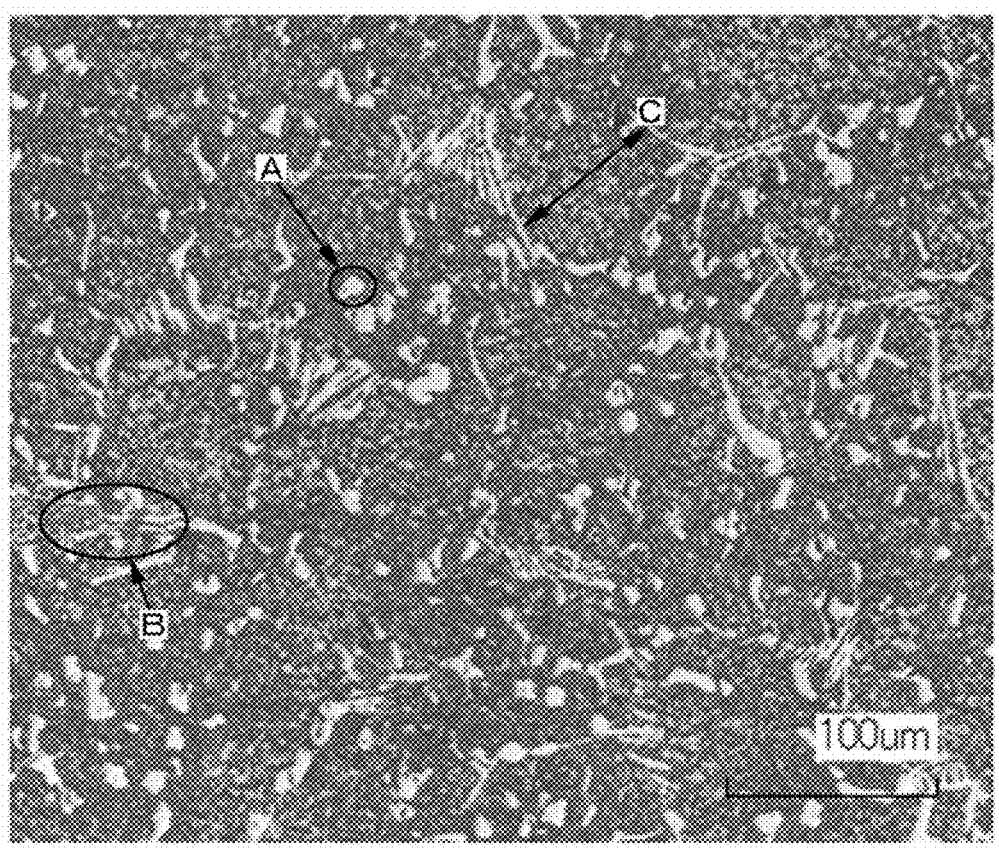
FIG. 4 is a photograph of the microscopic structure of an outer layer material 5 in the briquetting roll 1.

FIG. 4 illustrates a photograph of the microscopic structure of the outer layer material 5 for the briquetting roll 1 (of Working Example 1, described above) according to the invention. In this drawing, MC carbide is observed in the "A" portion (portion surrounded by the circle), and $M_7C_3$ carbide is observed in the "B" portion (portion surrounded by the oval). A secondary dendrite is observed in the "C" portion, and the secondary dendrite size is confirmed by the length thereof (the length of the arrow). Note that, in the outer layer material 5 in this photograph, the total carbide area ratio is measured at 16.49%.

Figure 5A:
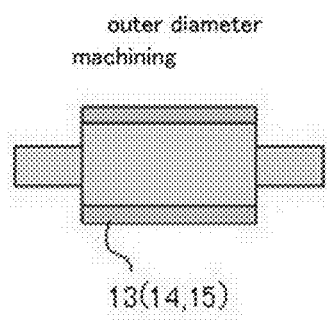
FIGS. 5A to 5F are explanatory diagram illustrating the process after the continuous pouring process is performed in the manufacture of a divided type briquetting roll 1.
Figure 5B:
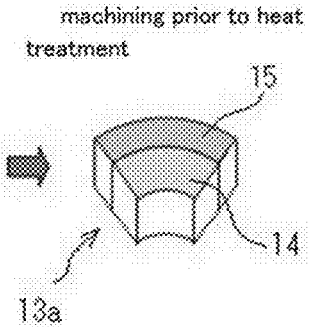
Figure 5C:
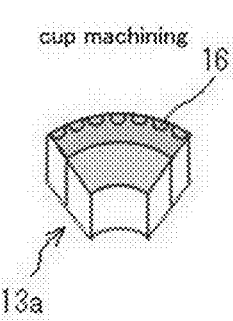
Figure 5D:
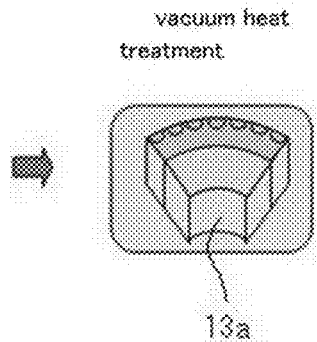
Figure 5E:
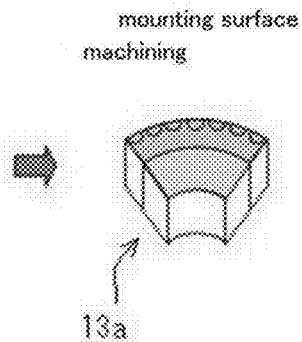
Figure 5F:
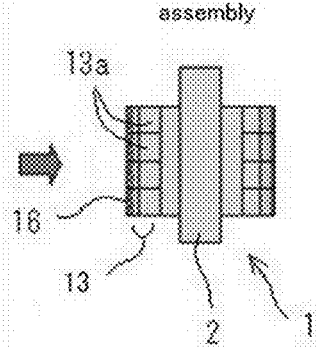

FIGS. 5A to 5F illustrate the manufacturing process for a divided type briquetting roll 1. The term divided type refers to attaching a plurality of divided segments in combination on the outer circumference of the drum on the shaft, rather than an integral type cylindrical sleeve. FIG. 5F illustrates a divided type briquetting roll 1 that has been assembled. A plurality of segments 13a, divided in the axial direction and the circumferential direction, are attached to the drum on the shaft 2 by bolts or the like, so as to form a sleeve 13 as a whole. Note that, in this example as well, a two-layer structure is adopted for the segments 13a that are attached to the shaft 2.

The manufacturing procedure for the divided type briquetting roll 1 illustrated in FIGS. 5A to 5F are as follows.

First, a hollow core material serving as an inner layer material 14 is prepared, and an outer layer material 15 is clad on the outside of the core material by the continuous pouring process illustrated in FIG. 2, so as to manufacture the sleeve 13 having a two-layer structure. The SCM 440 forged steel material and high-carbon high-speed steel material similar to that in the example in FIG. 1 are used for the inner layer material 14 (core material) and the outer layer material 15.

The outer diameter of the outer layer material 15 is machined directly in a state in which the aforementioned cladding has been completed, or in a state in which the finished sleeve 13 is temporarily attached to the shaft for machining (FIG. 5A).

Next, the sleeve 13 is cut so as to divide the sleeve 13 in the axial direction and the circumferential direction respectively, so as to prepare a plurality of arcuate segments 13a (which are sector-shaped, the inside being the inner layer material 14 and the outside being the outer layer material 15). The surfaces of the segments 13a are mechanically machined (machining prior to heat treatment) (FIG. 5B).

Subsequently, the segments 13a are annealed, and then a multiplicity of pockets (cups) 16 are formed by mechanical machining into the surface of the outer layer material 15 (FIG. 5C).

The segments 13a for which formation of the pockets 6 at the outer circumference has been completed are heat-treated in a vacuum furnace (FIG. 5D). The heat treatment is similar to that in the example introduced by way of FIGS. 3A to 3F and, after performing homogenization heat treatment, quenching by nitrogen cooling is carried out, in addition to which secondary hardening heat treatment and final tempering are performed. As a result, the outer layer material 15 has a similar structure and a similar surface hardness to the outer layer material 5 in the example in FIGS. 3A to 3F.

After the heat treatment, the mounting surfaces of the segments 13a are machined (FIG. 5E). The term mounting surface refers to a joining surface with an adjacent segment 13a, a joining surface with the drum on the shaft 2, or furthermore to a fitting part such as for an attachment bolt.

Thereafter, the divided type briquetting roll 1 is completed by attaching all of the divided segments 13a to the drum on the shaft 2, so as to cover the entire outer circumferential surface of the drum (FIG. 5F). Bolts (not illustrated) are used for attaching the segments 13a to the shaft 2. A fitting part for the bolts (a through hole leading to the inner circumferential surface and a seat face for a bolt head) is formed on portion of the outer circumference of each of the segments 13a, threaded holes for the bolts are formed in the surface of the drum on the shaft 2, and the segments 13a are fixed to the shaft 2 by fastening them with bolts. Note that, in the case of the divided type briquetting roll 1 as well, two rolls are used and arranged as illustrated in FIG. 1A.

Based on a suitable combination of the inner layer material and the outer layer material, the divided type briquetting roll 1 has excellent abrasion resistance and spalling resistance, in addition to which, because the outer circumference is divided into a plurality of segments, there is an advantage that, even if spalling occurs locally, it suffices to replace some of the segments.

Note that, there are no particular limitations on the shape of the pockets in the present invention, including the examples introduced above. For example, hemispherical pockets, a columnar pockets with arcuate ends, conical pockets, and the like are conceivable.

Furthermore, the briquetting roll of the invention is not limited to cases in which ironmaking dust is briquetted, but rather can also be used for the production of various pellet-like members, for example, the production of coal briquettes, tablets, processed foods and the like.

REFERENCE SIGNS LIST

1 Briquetting roll
2 Shaft
3 Sleeve 3
4 Inner layer material
5 Outer layer material
6 Pocket

The invention claimed is:

1. A briquetting roll, integrally having an inner layer material and an outer layer material, which comprise mutually different materials and are in contact with each other at a respective exterior and interior thereof, and having pockets formed at an outer circumference of the outer layer material, wherein
the inner layer material is a chromium-molybdenum forged steel material, and the outer layer material is a high-carbon high-speed steel material:
wherein the high-carbon high-speed steel material, which is the outer layer material, comprises, as mass ratios, C: 1.5 to 2.5%, Si: 0.2to 1.0%, Mn: 0.2 to 1.2%, Ni: 0 to 1.6%, Cr: 2.5 to 11%, Mo: 0.2 to 8.0%, V: 0.2 to 8.5%, W: 0 to 5.0%, Co: 0 to 5.0%, and a balance of Fe and inevitable impurities, having a secondary dendrite size of 20 to 150 μm, a total carbide area ratio of 15 to 30%, and a surface hardness of HS 87 to 93.

2. The briquetting roll according to claim 1, wherein the inner layer material is SCM 440.

3. The briquetting roll according to claim 1, wherein the outer layer material is formed on an outside of the inner layer material by a continuous pouring process.

4. The briquetting roll according to claim 1, wherein, after the outer layer material is formed on the outside of the inner layer material, homogenization heat treatment and quenching by nitrogen cooling are carried out in a vacuum furnace.

5. The briquetting roll according to claim 1, wherein a sleeve integrally having the inner layer material and the outer layer material, and having pockets formed at the outer circumference of the outer layer material, is shrink-fitted on an outer circumference of a drum on a shaft.

6. The briquetting roll according to claim 1, wherein a plurality of arcuate segments integrally having the inner layer material and the outer layer material, and having pockets formed at the outer circumference of the outer layer material are attached on a drum of a shaft so as to cover the outer circumference of the outer layer material.

7. A method for manufacturing a briquetting roll, the roll integrally having an inner layer material and an outer layer material, which comprise mutually different materials and are in contact with each other at a respective exterior and interior thereof, and having pockets formed at an outer circumference of the outer layer material, wherein
a chromium-molybdenum forged steel material is used for the inner layer material and the outer layer material is formed on an outside of the inner layer material by cladding with a high-carbon high-speed steel material by a continuous pouring process, wherein the high-carbon high-speed steel material contains carbon at a mass ratio of 1% or more and Cr, Mo, V and W.

8. The method for manufacturing a briquetting roll according to claim 7, wherein, after the outer layer material is formed on the outside of the inner layer material as described above, homogenization heat treatment and quenching by nitrogen cooling are carried out in a vacuum furnace.

9. The method for manufacturing a briquetting roll according to claim 7, wherein, after the outer layer material is formed on the outside of the inner layer material as described above, annealing is performed, and then pockets are mechanically machined into a surface of the outer layer material, whereafter homogenization heat treatment and quenching by nitrogen cooling are carried out in a vacuum furnace.

10. The method for manufacturing a briquetting roll according to claim 7, wherein the inner layer material is cylindrical, the outer layer material is formed on the outside of the inner layer material to produce an integral sleeve, pockets are mechanically machined into a surface of the sleeve, and then quenching is carried out, and the sleeve is shrink-fitted on an outer circumference of a drum on a shaft.

11. The method for manufacturing a briquetting roll according to claim 7, wherein, after the outer layer material is formed on an entire outer circumference of a cylindrical inner layer material by a continuous pouring process, the inner layer material and the outer layer material are divided into a plurality of arcuate segments, and
for each segment, annealing is performed, and then pockets are mechanically machined into the surface of the outer layer material, whereafter homogenization heat treatment and quenching by nitrogen cooling are carried out in a vacuum furnace, and after machining a mounting surface, all of the segments are attached to a drum on a shaft so as to cover the outer circumference of the drum.

* * * * *